United States Patent
Cohen et al.

(10) Patent No.: US 11,714,653 B1
(45) Date of Patent: Aug. 1, 2023

(54) FINE-GRAINED PIPELINING USING INDEX SPACE MAPPING

(71) Applicant: HABANA LABS LTD., Caesarea (IL)

(72) Inventors: Tzachi Cohen, Tzur-Igal (IL); Michael Zuckerman, Tel Aviv (IL); Doron Singer, Tel Aviv (IL); Ron Shalev, Pardes Hana-Karkur (IL); Amos Goldman, Pardes Chana Karkur (IL)

(73) Assignee: HABANA LABS LTD., Caesarea (IL)

( * ) Notice: Subject to any disclaimer, the term of this patent is extended or adjusted under 35 U.S.C. 154(b) by 398 days.

(21) Appl. No.: 17/175,733

(22) Filed: Feb. 15, 2021

Related U.S. Application Data

(60) Provisional application No. 63/008,845, filed on Apr. 13, 2020.

(51) Int. Cl.
  *G06F 9/38* (2018.01)
  *G06F 9/48* (2006.01)
  *G06F 9/54* (2006.01)

(52) U.S. Cl.
  CPC .......... *G06F 9/3836* (2013.01); *G06F 9/3814* (2013.01); *G06F 9/3867* (2013.01); *G06F 9/4881* (2013.01); *G06F 9/544* (2013.01)

(58) Field of Classification Search
  CPC .... G06F 9/3836; G06F 9/3814; G06F 9/3867; G06F 9/4881; G06F 9/544
  See application file for complete search history.

(56) References Cited

U.S. PATENT DOCUMENTS

| | | |
|---|---|---|
| 10,489,479 B1 | 11/2019 | Gofman et al. |
| 10,713,214 B1 | 7/2020 | Halutz et al. |
| 2005/0039167 A1 | 2/2005 | Fernandes et al. |
| 2014/0331014 A1 | 11/2014 | Liao |
| 2016/0170770 A1 | 6/2016 | Cain, III et al. |
| 2017/0147531 A1 | 5/2017 | Bekas et al. |
| 2018/0225158 A1* | 8/2018 | Guigui ................... G06F 9/542 |
| 2020/0301877 A1 | 9/2020 | Gupta et al. |

OTHER PUBLICATIONS

Agosta et al., "Detecting Data Access Patterns in OpenMP Parallel Loops", Politecnico Di Milano, pp. 1-110, years 2011-2012.
(Continued)

*Primary Examiner* — Wissam Rashid
(74) *Attorney, Agent, or Firm* — Kligler & Associates Patent Attorneys Ltd

(57) ABSTRACT

A method for computing includes defining a processing pipeline, including at least a first stage in which producer processors compute and output data to respective locations in a buffer and a second processing stage in which one or more consumer processors read the data from the buffer and apply a computational task to the data read from the buffer. The computational task is broken into multiple, independent work units, for application by the consumer processors to respective ranges of the data in the buffer, and respective indexes are assigned to the work units in a predefined index space. A mapping is generated between the index space and the addresses in the buffer, and execution of the work units is scheduled such that at least one of the work units can begin execution before all the producer processors have completed the first processing stage.

20 Claims, 5 Drawing Sheets

(56) References Cited

OTHER PUBLICATIONS

Zima, "On Computational Properties of Chains of Recurrences," ACM Proceedings of International Symposium on Symbolic and Algebraic Computation, pp. 1-8, year 2001.

Pop et al., "Fast Recognition of Scalar Evolutions on Three-Address SSA Code", CRI/ENSMP Research Report A/354/CRI, pp. 1-28, Apr. 1, 2004.

Bachman et al., "Chains of Recurrences—a Method to Expedite the Evaluation of Closed-Form Functions," ACM Proceedings of International Symposium on Symbolic and Algebraic Computation, pp. 242-249, Jul. 1994.

Grosser, "Enabling Polyhereal Optimizations in LLVM," Diploma Thesis, Programming Group, Department of Informatics and Mathematics, University of Passau, Germany, pp. 1-101, Apr. 2011.

Birch et al, "An Empirical Evaluation of Chains of Recurrences for Array Dependence Testing," ACM Proceedings of PACT'06, Seattle, USA, pp. 295-304, Sep. 16-20, 2006.

Engelen, "Efficient Symbolic Analysis for Optimizing Compilers", Proceedings of the 10th International Conference on Compiler Construction, pp. 118-132, Apr. 2001.

* cited by examiner

US 11,714,653 B1

FINE-GRAINED PIPELINING USING INDEX SPACE MAPPING

CROSS-REFERENCE TO RELATED APPLICATION

This application claims the benefit of U.S. Provisional Patent Application 63/008,845, filed Apr. 13, 2020, which is incorporated herein by reference.

FIELD OF THE INVENTION

The present invention relates generally to multiprocessor computer systems, and particularly to methods for parallelization and pipelining of computer system operations, as well as devices and software implementing such methods.

BACKGROUND

Deep learning workloads are highly computation-intensive and often benefit from parallelization of computing tasks in specialized multiprocessor devices, such as graphic processing units (GPUs). Convolutional neural networks (CNNs), for example, typically comprise multiple convolutional layers, each of which performs multidimensional convolutions between an input tensor and a set of filter kernels. The convolutional layers are interleaved in a pipeline with other computational layers that perform operations such as pooling and linear unit rectification. Each layer in the pipeline writes the results of its computations to an output buffer, which becomes the input buffer for the next stage.

The term "parallel computations," as used in the context of the present description and in the claims, refers to arrangements in which multiple processors concurrently execute tasks related to a program objective. Typically, a large problem is divided into multiple smaller computations, also referred to as tasks, which are submitted to the individual processors. The term "pipeline" as used in the present context refers to a series of tasks or subprograms, performed the processors in an overlapping or time-sliced fashion, in which a computational result produced by a first processor, which performs a first task, is transferred as an input to a second processor, which performs a second task. The computational result of the second processor is typically transferred as an input to a third processor, and so forth.

To enable efficient programming and parallel execution of these sorts of workloads, a number of parallel programming models and application programming interfaces (APIs) have been developed, such as CUDA®, OpenCL™ and SYCL™. These models break the workload up into independent work units, which can execute in a random order. Each work unit is identified by an index in an index space of the computational operation to which it belongs. The non-deterministic order of execution of the work units typically mandates that the data in the input buffer of a given processing stage be available in its entirety before any part of its assigned workload begins execution (i.e., before execution of any of work units in the index space can be initiated). By the same token, the output buffer of a processing stage can be read only after all the work units in the stage have finished execution.

SUMMARY

Embodiments of the present invention that are described hereinbelow provide improved methods, devices and software for parallelization and pipelining of computer system operations.

There is therefore provided, in accordance with an embodiment of the invention, a method for computing, which includes defining a processing pipeline including multiple, sequential stages of parallel computations, including at least a first processing stage in which a first plurality of producer processors compute and output data to respective locations in a buffer and a second processing stage in which one or more consumer processors read the data from the buffer and apply a computational task to the data read from the buffer. The computational task is broken into multiple, independent work units, for application by the one or more consumer processors to respective ranges of the data in the buffer. Respective indexes are assigned to the work units in a predefined index space, and a mapping is generated between the index space and the addresses in the buffer, indicating by the mapping the respective ranges of the data to which the work units are to be applied. Responsively to the mapping, execution of the work units by the one or more consumer processors is scheduled such that at least one of the work units can begin execution before all the producer processors have completed the first processing stage and outputted the data to the respective locations in the buffer. The stages in the processing pipeline are executed in accordance with the scheduling.

In a disclosed embodiment, generating the mapping includes defining a linear transformation between values in the index space and the addresses in the buffer. Additionally or alternatively, generating the mapping includes defining a multi-dimensional transformation between the addresses in the buffer and the index space. In one embodiment, the multi-dimensional transformation applies different, respective coefficients to transform different dimensions of the buffer.

In some embodiments, generating the mapping includes generating a first mapping between a first index space of the second processing stage and the addresses in a first buffer holding the data to be processed in the second processing stage, and generating at least a second mapping, different from the first mapping, between one or more further index spaces of one or more further stages in the processing pipeline and one or more further buffers holding the data to be processed in the one or more further processing stages.

In one embodiment, generating the mapping includes applying a static code analysis to a computer program that is to be executed by the processing pipeline, and deriving the mapping from the static code analysis.

In some embodiments, at least the first processing stage includes a tensor convolution operation.

In a disclosed embodiment, executing the stages includes signaling the one or more computer processors to begin the execution of each of the work units upon receiving an indication from the first processing stage that a respective range of the data has been output to the buffer.

There is also provided, in accordance with an embodiment of the invention, computing apparatus, including a memory and a processing pipeline including multiple, sequential stages of parallel computations. The stages include at least a first processing stage in which a first plurality of producer processors compute and output data to respective locations in a buffer in the memory, and a second processing stage in which one or more consumer processors read the data from the buffer and apply a computational task to the data read from the buffer. A scheduler is configured to break the computational task into multiple, independent work units, for application by the one or more consumer processors to respective ranges of the data in the buffer, to assign respective indexes to the work units in a predefined index space, to receive a mapping between the index space and the addresses in the buffer, indicating by the mapping the respective ranges of the data to which the work units are to be applied, and responsively to the mapping, to schedule execution of the work units by the one or more consumer processors such that at least one of the work units can begin execution before all the producer processors have completed the first processing stage and outputted the data to the respective locations in the buffer.

There is additionally provided, in accordance with an embodiment of the invention, a computer software product, including a tangible, non-transitory computer-readable medium in which program instructions are stored, which instructions, when read by a processor, cause the processor to receive a definition of a processing pipeline including multiple, sequential stages of parallel computations, including at least a first processing stage in which a first plurality of producer processors compute and output data to respective locations in a buffer and a second processing stage in which one or more consumer processors read the data from the buffer and apply a computational task to the data read from the buffer. The instructions cause the processor to break the computational task into multiple, independent work units, for application by the one or more consumer processors to respective ranges of the data in the buffer, to assign respective indexes to the work units in a predefined index space, to receive a mapping between the index space and the addresses in the buffer, indicating by the mapping the respective ranges of the data to which the work units are to be applied, and responsively to the mapping, to schedule execution of the work units by the one or more consumer processors such that at least one of the work units can begin execution before all the producer processors have completed the first processing stage and outputted the data to the respective locations in the buffer.

The present invention will be more fully understood from the following detailed description of the embodiments thereof, taken together with the drawings in which:

DETAILED DESCRIPTION OF EMBODIMENTS

Overview

Figure 1:
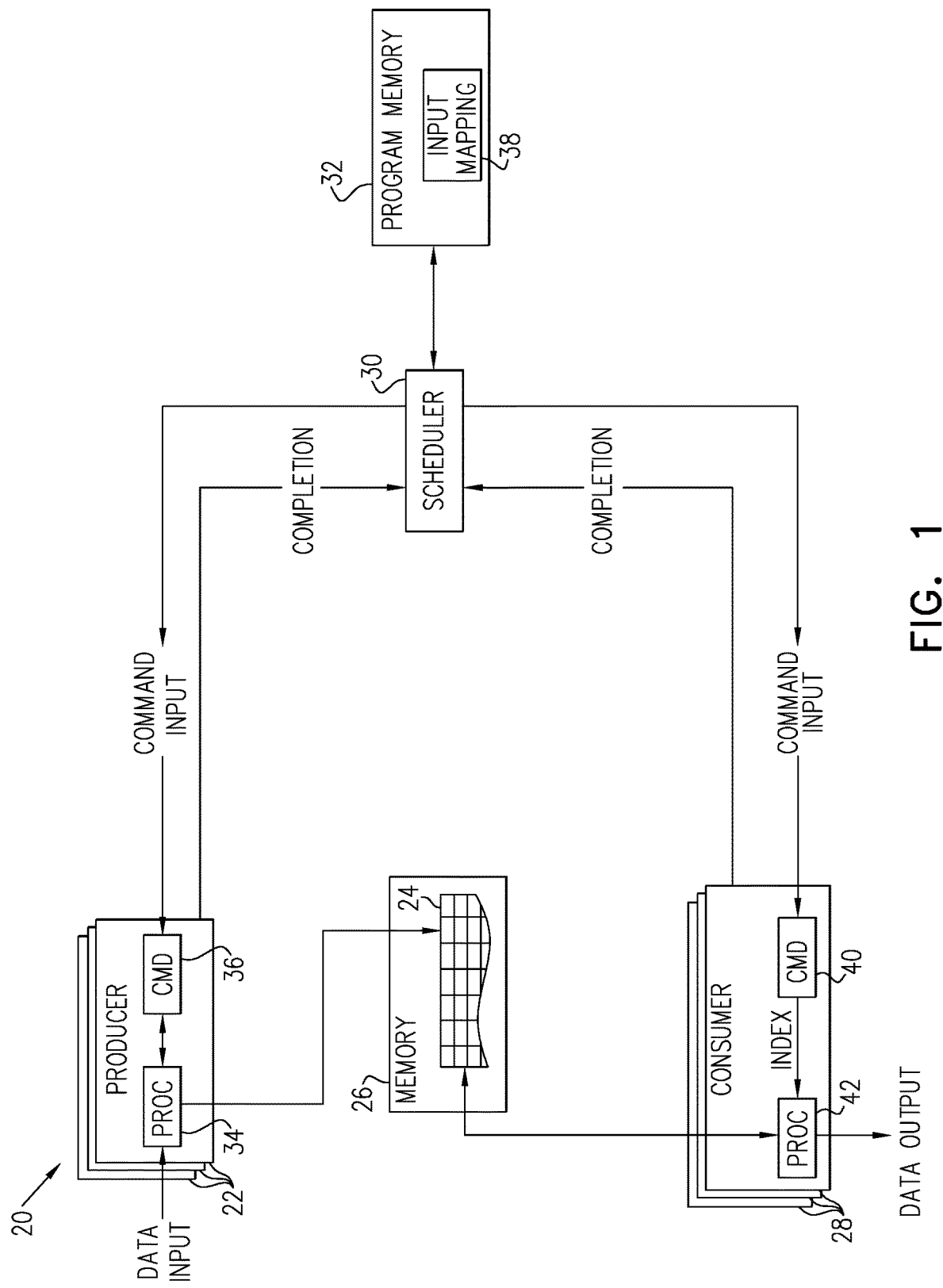
FIG. 1 is block diagram that schematically illustrates elements of a computer system with fine-grained pipelining, in accordance with an embodiment of the invention.

Parallel programming models and APIs, such as the above-mentioned CUDA, OpenCL and SYCL, are useful in parallelizing the execution of each stage in a program pipeline. Using these models, each of the work units in a given pipeline stage outputs data to a certain address or range of addresses in a buffer in memory. The buffer serves as the input for the next stage of the pipeline, and each of the work units in the next stage reads the data that it is to process from an assigned range of addresses in the buffer. The output address ranges of the work units in a given stage do not generally correspond to the input address ranges of the work units in the next stage. Consequently, as noted earlier, the next stage cannot begin execution on a given data workload until all the work units in the preceding stage have completed execution.

To increase the data throughput of the program and efficiency of execution, it would be desirable to design the program for "fine-grain pipelining," meaning that at least some of the work units in the next pipeline stage can begin execution before all the work units in the preceding pipeline stage have completed execution. This sort of pipelining could be implemented, at least in principle, by coordination between the work units in the different pipeline stages, for example by means of a suitable handshake mechanism. In practice, however, this sort of coordination is difficult and painstaking and may not be possible at all in complex, large-scale programs.

Embodiments of the present invention that are described herein enable fine-grain pipelining to be implemented automatically, by means of mapping between indexes of the work units in the index space of a given processing stage and corresponding address ranges in the input buffer of this processing stage. In other words, the index of each work unit is mapped to the range of data to be read by this work unit from the input buffer, which is the output buffer of the preceding stage. (The index space of a given stage may likewise be mapped to the address ranges in the output buffer to which the corresponding work unit write processed data.)

Once the preceding stage has output data to a given range in the buffer, the mapping of buffer addresses can be used to identify the index of the corresponding work unit or units in the next stage that will consume the data. These work units can then be triggered to execute immediately, even before all the work units in the preceding stage have completed execution. By virtue of the mapping, this sort of fine-grain pipelining can be carried out by a program scheduler without any sort of handshake or other coordination between the pipeline stages. Thus, with little or no added burden on the programmer, the pipeline can achieve higher data throughput and make more efficient use of the available computational resources (and consequently reduce overall power consumption, as well).

For simplicity of implementation, the mapping can advantageously take the form of a linear transformation between values in the index space and the addresses in the buffer. Alternatively, nonlinear mappings may be used, as long as they are reversible. In applications that involve matrix and tensor operations, the buffers are multi-dimensional, and accordingly, in some embodiments, the mapping uses a multi-dimensional transformation, which applies different coefficients to different dimensions of the buffer. In multi-stage pipelines, with different respective buffers and index spaces used in each stage, a different mapping can be used in each stage.

System Description

FIG. 1 is block diagram that schematically illustrates elements of a computer system 20 with fine-grained pipelining, in accordance with an embodiment of the invention. System 20 comprises a processing pipeline comprising multiple, sequential stages of parallel computations. For the sake of simplicity, only two stages are shown in FIG. 1: a first processing stage in which multiple producer processors 22 compute and output data to respective locations in a buffer 24 in a memory 26, such as a static random-access memory (SRAM); and a second processing stage in which one or more consumer processors 28 read the data from buffer 24 and apply a computational task to the data read from the buffer.

The terms "producer" and "consumer" are used for the sake of convenience and clarity to distinguish between the roles of the two stages shown in FIG. 1 with respect to the data in buffer 24. In practice, consumer processors 28 will output data to a further buffer and will thus serve as the producers for consumers in a subsequent processing stage, and so forth over multiple successive stages and buffers in the pipeline. The principles of the present invention may be applied in any or all of these stages, typically with a different mapping of the buffer to the index space in each stage.

In some embodiments, at least some of the processors, for example producer processors 22, comprise multiplier/accumulator processing elements 34, which are configured to carry out matrix and tensor operations, such as large-scale tensor convolutions. Arrays of processing elements of this sort are described, for example, in U.S. Pat. No. 10,489,479, whose disclosure is incorporated herein by reference. Alternatively, processors 22 and 28 may comprise special-purpose or general-purpose processing elements of other sorts.

A scheduler 30 reads program instructions from a program memory 32 and distributes corresponding command inputs to producer processors 22 and consumer processors 28. Producer processors 22 receive the command inputs in respective command buffers 36. Processing elements 34 carry out the work units invoked by the commands by reading data from appropriate addresses in an input buffer (not shown) and then writing the computational results to appropriate address ranges in buffer 24. Upon completing a work unit and outputting the corresponding data to buffer 24, processors 22 report the completion to scheduler 30. In similar fashion, consumer processors 28 receive command inputs in respective command buffers 40. These command inputs drive respective processing elements 42 to read a certain range of input data from buffer 24, apply the corresponding work unit to the input data, output the resulting output data, and report completion back to scheduler 30. As was noted earlier and will be explained further hereinbelow, each work unit is identified by a corresponding index.

Scheduler 30 is typically implemented as a software-driven process running on a programmable processor in system 20. The software that drives the operation of scheduler 30 may be downloaded to system 20 in electronic form, for example over a network. Alternatively or additionally, the software is stored in tangible, non-transitory computer-readable media, such as electronic, optical, or magnetic memory. Further alternatively or additionally, at least some of the functions of scheduler 30 may be implemented in hardware logic, which may be hard-wired or programmable.

For purposes of scheduling, each computational task that is to be carried out by a given pipeline stage is broken into multiple, independent work units, for example in accordance with one of the parallel programming models mentioned above. This division into work units may be performed in code written by a programmer, or it may be carried out automatically by a suitable compiler. As noted earlier, each such work unit has a respective index that is assigned in an index space of the task in question. Each work unit will be applied by a processor, for example by one of consumer processors 28, to a respective range of the data in an input buffer, such as buffer 24. In deciding which work units to assign to one or more of consumer processors 28 in any given processing cycle, scheduler 30 accesses an index map 38 in memory 32. Index map 38 provides a mapping between the index space and the addresses in buffer 24, indicating the respective range of data in the buffer to which each of the work units is to be applied. Map 38 may similarly indicate the respective range of output data written to buffer 24 by each work unit executed by producer processors 22.

Thus, for example, upon receiving a notification from one or producer processors 22 that it has completed a given work unit, scheduler 30 uses mapping 38 to identify the range in buffer 24 to which the producer processor has written output data. The scheduler then uses the mapping between memory ranges and indexes of the consumer work units to schedule and initiate execution of the work units for which corresponding ranges of memory are ready in buffer 24. In general, the respective ranges of input data that are mapped to the work units executed by consumer processors 28 are different from the respective ranges of output data generated by work units of producer processors 22. As noted earlier, scheduler 30 can initiate a given consumer work unit as soon as the range of input data that is mapped to the index of the work unit is ready in buffer 24, even while producer processors 22 have not yet completed all of the producer work units.

Methods of Index Space Mapping and Execution

Figure 2:
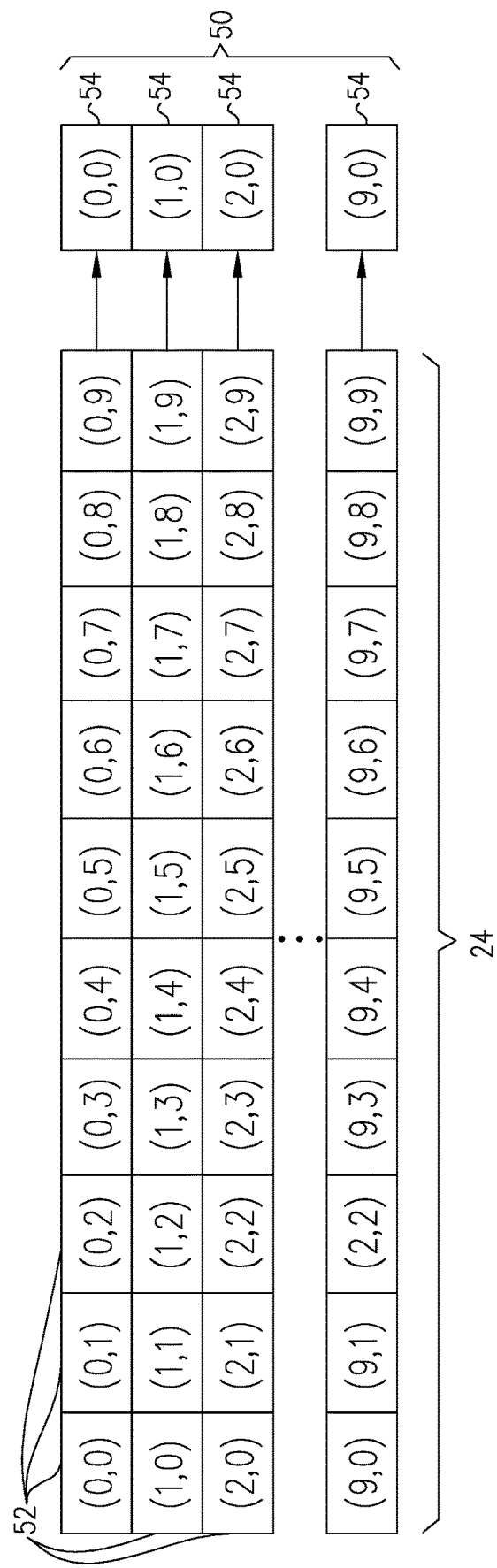
FIGS. 2 and 3 are block diagrams that schematically illustrate methods for index space mapping, in accordance with an embodiment of the invention.

FIG. 2 is a block diagram that schematically illustrates a mapping between addresses 52 in buffer 24 and an index space 50 of consumer processors 28 (FIG. 1), in accordance with an embodiment of the invention. Each address 52 contains a scalar value, corresponding, for example, to an element of a tensor output of a convolution operation by producer processors 22. In the present example, it is assumed that consumer processors 28 execute a program stage called "sum," which sums the values in each row of buffer 24 to produce a single scalar value per input row. Each index 54 in index space 50 thus identifies a work unit that sums a given row in the buffer.

The "sum" operation can be represented by the following program code:

Listing 1—"Sum"

```
void main (tensor input, tensor output)
{
  int row=get_global_id(0);
  int5 coords;
  coords[1]=row;
  float sum=0;
  for (int column=0; column < input.size(0); column++)
  {
    coords[0]=column;
    sum+=input.read(coords);
  }
  coords[0]=0;
  output.store(coords,sum)
}
```

The appropriate size of index space 50 in this simplified example is (10,1), since there are ten rows in buffer 24, and each work unit consumes a whole row. A work unit of index value $(x_i, x_j)$ will consume the data in a range of addresses 52 between $f_{min}(x)$ and $f_{max}(x)$ that is given by the following linear transformation in each of the i and j (column and row) dimensions:

$$f_{min}(x) = \alpha_{min} x + \beta_{min}$$

$$f_{max}(x) = \alpha_{max} x + \beta_{max},$$

Applying the mapping in the two dimensions of the input tensor in buffer 24 gives the following mapping parameters:

Dim0 (columns): $\alpha_{min}=0$, $\alpha_{max}=0$, $\beta_{min}=0$, $\beta_{max}=9$
Dim1 (rows): $\alpha_{min}=1$, $\alpha_{max}=1$, $\beta_{min}=0$, $\beta_{max}=0$ This sort of mapping can be specified explicitly by a programmer of the processing pipeline; or it may alternatively be inferred by applying a static code analysis to the program, for example by a suitable compiler.

According to this mapping, the work unit identified by index space value (5,0) will be mapped to the following range of addresses in buffer 24:

Dim0 start is 0*5+0=0

Dim0 end is 0*5+9=9

Dim1 start is 1*5+0=5

Dim1 end is 1*5+0=5

Figure 5:
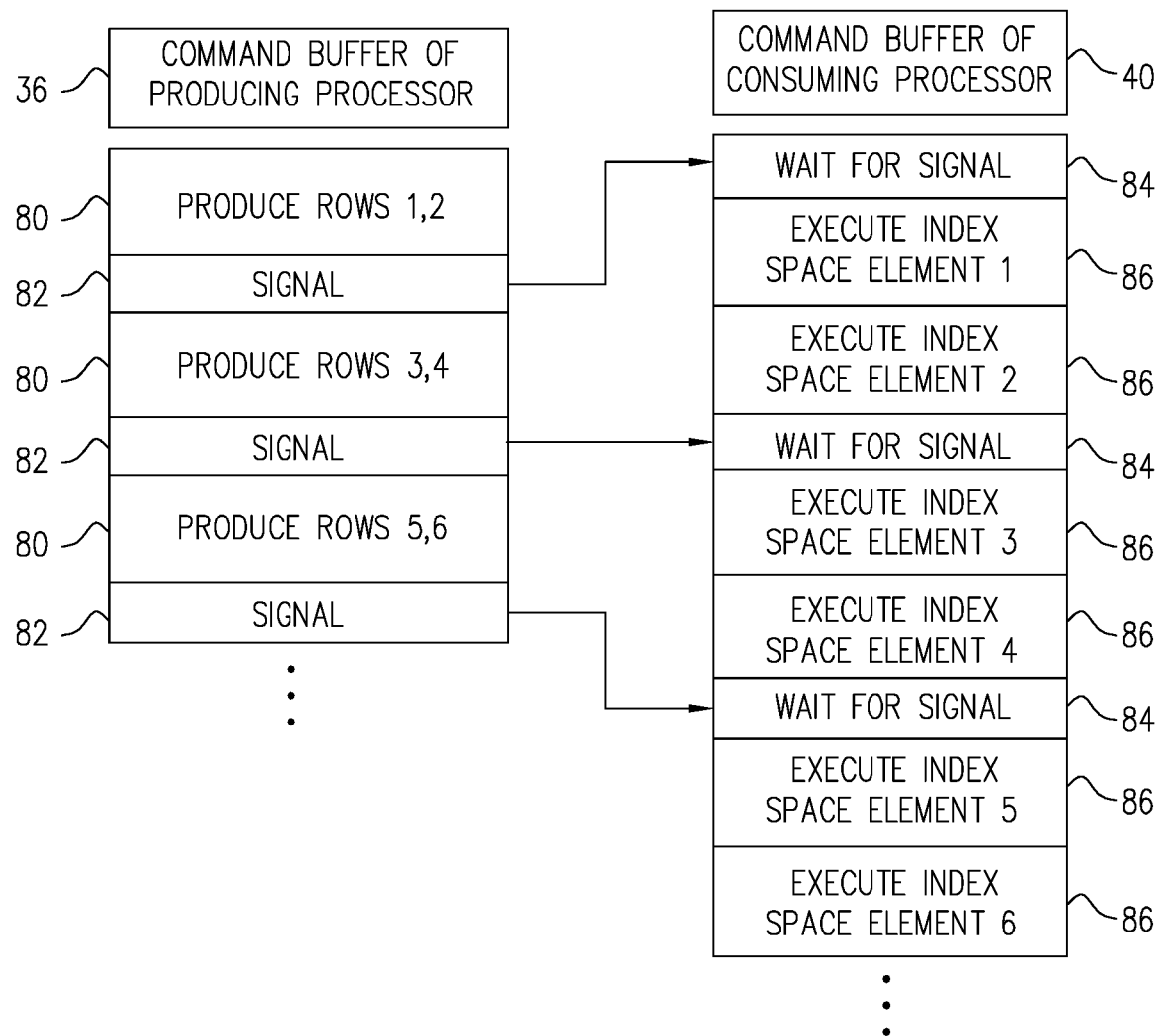
FIG. 5 is a block diagram that schematically illustrates execution of a sequence of pipelined operations, in accordance with an embodiment of the invention.

Thus, this work unit will access the row of input tensor elements (5,0) . . . (5,9), as required by the above code listing. As soon as the work unit (or units) of producer processors 22 that is responsible for writing this row of tensor elements has been completed, scheduler 30 can invoke the execution of work unit (5,0) by a consumer processor 28. This mode of operation is illustrated in FIG. 5.

Figure 3:
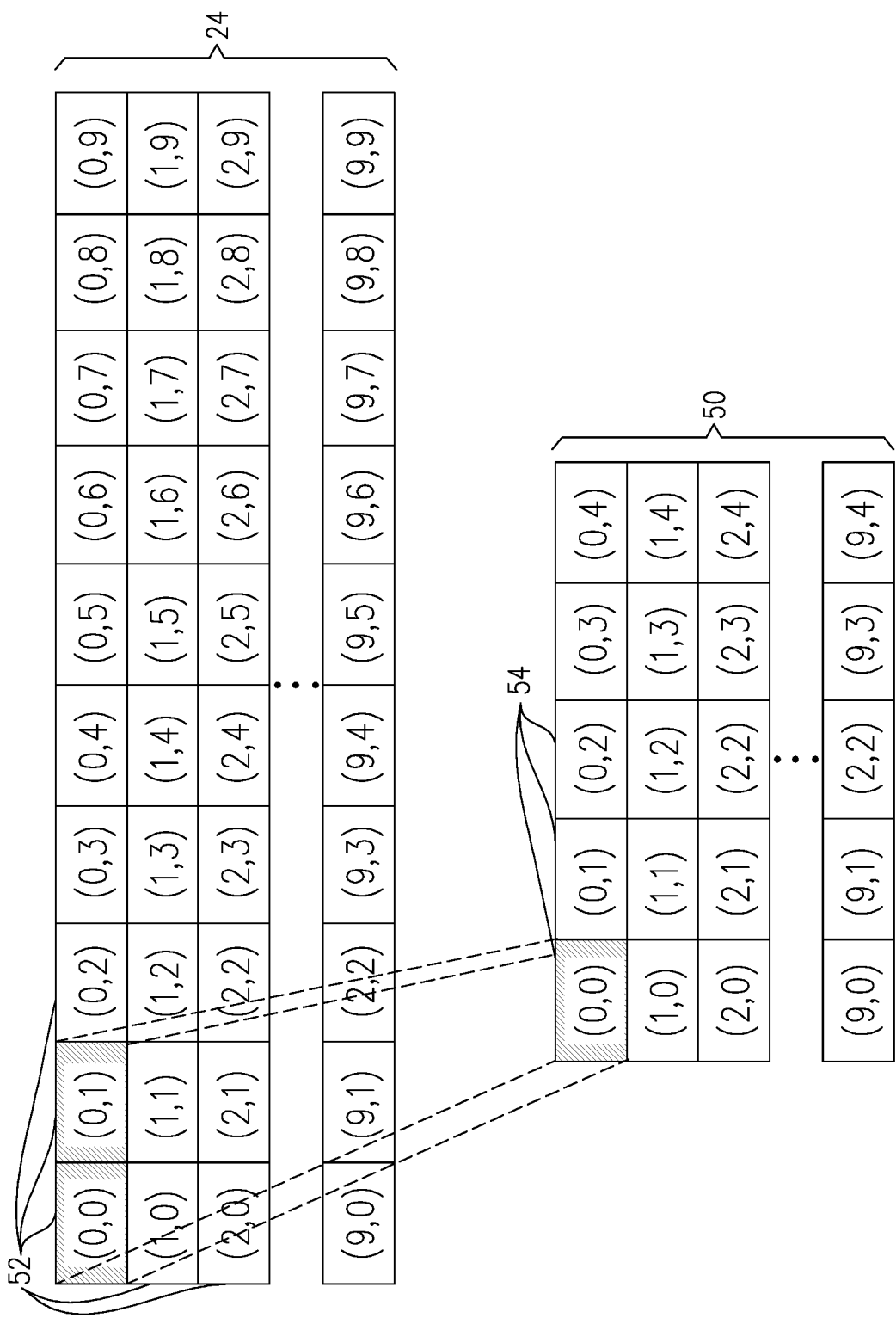
Figure 4:
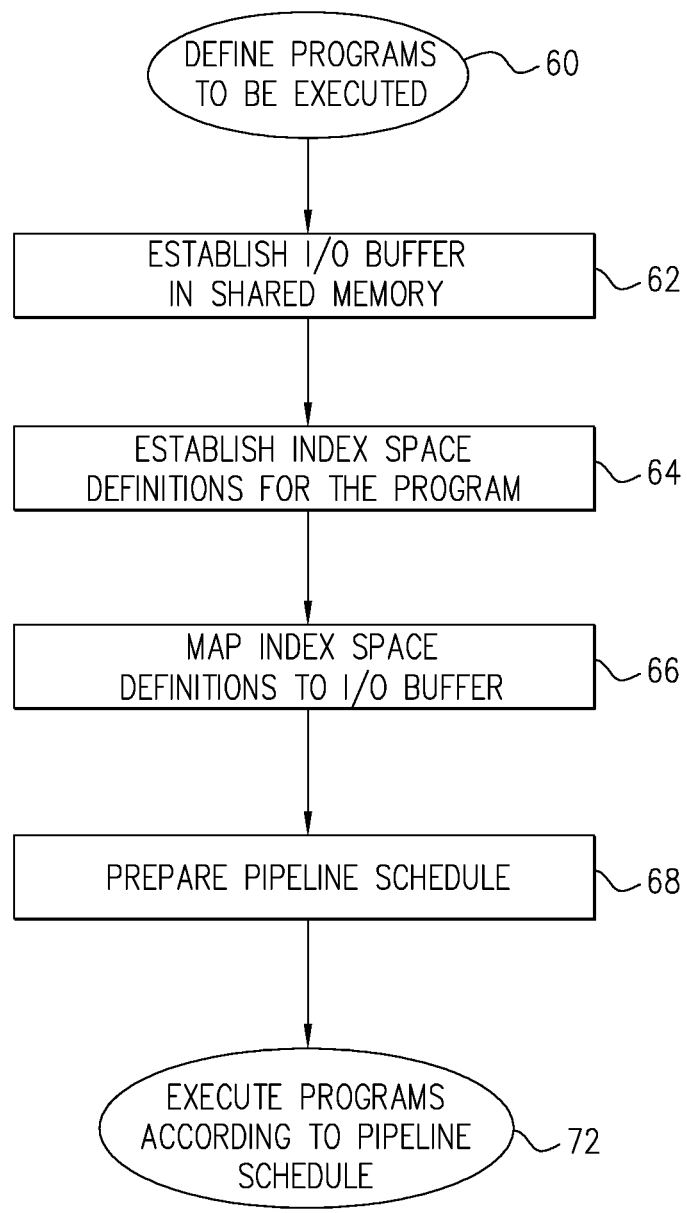
FIG. 4 is a flow chart that schematically illustrates a method for pipelined program execution, in accordance with an embodiment of the invention.

FIG. 3 is a block diagram that schematically illustrates a mapping between addresses 52 in buffer 24 and index space 50 of consumer processors 28, in accordance with another embodiment of the invention. In this example, each work unit executed by consumer processors 28 consumes two adjacent data elements in buffer 24. Index space 50 thus has dimensions (10,5). In this case, the mapping parameters will be:

Dim0 (columns): $\alpha_{min}=2$, $\alpha_{max}=2$, $\beta_{min}=0$, $\beta_{max}=1$
Dim1 (rows): $\alpha_{min}=1$, $\alpha_{max}=1$, $\beta_{min}=0$, $\beta_{max}=0$ FIG. 4 is a flow chart that schematically illustrates a method for pipelined program execution, which makes use of the sort of mapping that is described above, in accordance with an embodiment of the invention. For the sake of clarity and concreteness, the method is described with reference to the elements of system 20 that are shown in FIG. 1. Alternatively, this method may be carried out, mutatis mutandis, in other processing environments that support pipelined execution of parallel processing operations.

In a program definition step 60, a programmer defines a processing pipeline comprising multiple, sequential stages of parallel computations. These stages include at least a first processing stage in which producer processors 22 compute and output data to respective locations in buffer 24, and a second processing stage in which one or more consumer processors 28 read the data from buffer 24 and apply a computational task to the data. At a buffer establishment step 62, buffer 24 is created in memory 26, which is shared by the producing and consuming processing stages, so that buffer 24 serves as the output buffer for the first stage and the input buffer for the second stage. As noted earlier, multiple processing stages can be defined in this way, with the consumer processors in one stage becoming the producers for the next.

The computational task to be performed at each processing stage is broken into multiple, independent work units, at a work unit definition step 62. Each such work unit will be applied by a given processor, as a consumer, to a respective range of the data in the appropriate buffer. The processor will write the computational result of the work unit, as a producer, to the next buffer in the pipeline. An index space is defined for each stage of the pipeline, and respective indexes are assigned to the work units in each stage, at an index space establishment step 64. A mapping is then generated between the index space of each stage and the respective ranges of addresses in the buffer that are to be accessed by the indexed work units, at a mapping step 66.

The principles and techniques that are to be applied in steps 62-66 were described above, together with a number of examples. For consumer processors 28 (FIG. 1), the mapping of step 66 indicates the respective range of the data in buffer 24 to which each of the work units is to be applied. For producer processors 22, there may also be a mapping indicating the range of data that is written to buffer 24 by each producer work unit. As noted earlier, steps 62, 64 and 66 may each be performed explicitly by a programmer, using tools such as those provided by CUDA, OpenCL or SYCL, for example. Alternatively, some or all of these steps may be performed automatically, for example by a suitably configured compiler using static code analysis. Further details of this sort of automatic implementation are described in the above-mentioned provisional patent application.

On the basis of the mapping created at step 66, a pipeline schedule is generated for execution of the program, at a scheduling step 68. This schedule indicates to scheduler 30 the dependence between completion of producer work units and the initiation of consumer work units. In other words, when a producer completion indicates to scheduler 30 that a certain range of data is now ready in buffer 24, the mapping of this range to the consumer index space can be used to initiate the work units that will consume this range of data. Using this schedule, at least one of the consumer work units (and typically multiple consumer work units) can begin execution before all the producer work units have been completed and outputted their data to their respective locations in buffer 24. The program is then executed in the pipeline of system 20 in accordance with the schedule, at an execution step 72.

FIG. 5 is a block diagram that schematically illustrates execution of a sequence of pipelined operations 80 and 86, in accordance with an embodiment of the invention. This example assumes that operations 80 are carried out by producer processors 22, while operations 86 are carried out by consumer processors 28 (FIG. 1), in accordance with the specific mapping that is shown in FIG. 2. Each work unit of operations 80 produces two rows of output data in buffer 24, which are mapped, in turn, to two work units of operations 86, having successive, respective indexes 54 in index space 50.

Thus, after outputting data to the first two rows in buffer 24, producer processor 22 issues a signal 82 (to scheduler 30), indicating that the corresponding producer work unit has been completed. Consumer processors 28 wait for a corresponding command from scheduler 30, in a wait state 84. Upon receiving the command, the consumer processor executes the first two work units of operations 86. In parallel, one of producer processors 22 produces and outputs data to the next two rows in buffer 24, and then issues signal 82 to trigger the next two work units of the consumer operation. These steps continue sequentially until the entire workload has been processed.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for computing, comprising:
defining a processing pipeline comprising multiple, sequential stages of parallel computations, including at least a first processing stage in which a first plurality of producer processors compute and output data to respective locations in a buffer and a second processing stage in which one or more consumer processors read the data from the buffer and apply a computational task to the data read from the buffer;
breaking the computational task into multiple, independent work units, for application by the one or more consumer processors to respective ranges of the data in the buffer;
assigning respective indexes to the work units in a predefined index space;
generating a mapping between the index space and the addresses in the buffer, indicating by the mapping the respective ranges of the data to which the work units are to be applied;
responsively to the mapping, scheduling execution of the work units by the one or more consumer processors such that at least one of the work units can begin execution before all the producer processors have completed the first processing stage and outputted the data to the respective locations in the buffer; and
executing the stages in the processing pipeline in accordance with the scheduling.

2. The method according to claim 1, wherein generating the mapping comprises defining a linear transformation between values in the index space and the addresses in the buffer.

3. The method according to claim 1, wherein generating the mapping comprises defining a multi-dimensional transformation between the addresses in the buffer and the index space.

4. The method according to claim 3, wherein the multi-dimensional transformation applies different, respective coefficients to transform different dimensions of the buffer.

5. The method according to claim 1, wherein generating the mapping comprises generating a first mapping between a first index space of the second processing stage and the addresses in a first buffer holding the data to be processed in the second processing stage, and generating at least a second mapping, different from the first mapping, between one or more further index spaces of one or more further stages in the processing pipeline and one or more further buffers holding the data to be processed in the one or more further processing stages.

6. The method according to claim 1, wherein generating the mapping comprises applying a static code analysis to a computer program that is to be executed by the processing pipeline, and deriving the mapping from the static code analysis.

7. The method according to claim 1, wherein at least the first processing stage comprises a tensor convolution operation.

8. The method according to claim 1, wherein executing the stages comprises signaling the one or more computer processors to begin the execution of each of the work units upon receiving an indication from the first processing stage that a respective range of the data has been output to the buffer.

9. Computing apparatus, comprising:
a memory;
a processing pipeline comprising multiple, sequential stages of parallel computations, the stages comprising at least:
a first processing stage in which a first plurality of producer processors compute and output data to respective locations in a buffer in the memory; and
a second processing stage in which one or more consumer processors read the data from the buffer and apply a computational task to the data read from the buffer; and
a scheduler, which is configured to break the computational task into multiple, independent work units, for application by the one or more consumer processors to respective ranges of the data in the buffer, to assign respective indexes to the work units in a predefined index space, to receive a mapping between the index space and the addresses in the buffer, indicating by the mapping the respective ranges of the data to which the work units are to be applied, and responsively to the mapping, to schedule execution of the work units by the one or more consumer processors such that at least one of the work units can begin execution before all the producer processors have completed the first processing stage and outputted the data to the respective locations in the buffer.

10. The apparatus according to claim 9, wherein the mapping comprises a linear transformation between values in the index space and the addresses in the buffer.

11. The apparatus according to claim 9, wherein the mapping comprises a multi-dimensional transformation between the addresses in the buffer and the index space.

12. The apparatus according to claim 11, wherein the multi-dimensional transformation applies different, respective coefficients to transform different dimensions of the buffer.

13. The apparatus according to claim 9, wherein the scheduler is configured to apply a first mapping between a first index space of the second processing stage and the addresses in a first buffer holding the data to be processed in the second processing stage, and to apply a second mapping, different from the first mapping, between one or more further index spaces of one or more further stages in the processing pipeline and one or more further buffers holding the data to be processed in the one or more further processing stages.

14. The apparatus according to claim 9, wherein the mapping is generated by applying a static code analysis to a computer program that is to be executed by the processing pipeline, and deriving the mapping from the static code analysis.

15. The apparatus according to claim 9, wherein at least the first processing stage comprises a tensor convolution operation.

16. The apparatus according to claim 9, wherein the scheduler is configured to signal the one or more computer processors to begin the execution of each of the work units upon receiving an indication from the first processing stage that a respective range of the data has been output to the buffer.

17. A computer software product, comprising a tangible, non-transitory computer-readable medium in which program instructions are stored, which instructions, when read by a processor, cause the processor to receive a definition of a processing pipeline comprising multiple, sequential stages of parallel computations, including at least a first processing stage in which a first plurality of producer processors compute and output data to respective locations in a buffer and a second processing stage in which one or more consumer processors read the data from the buffer and apply a computational task to the data read from the buffer, wherein the instructions cause the processor to break the computational task into multiple, independent work units, for application by the one or more consumer processors to respective ranges of the data in the buffer, to assign respective indexes to the work units in a predefined index space, to receive a mapping between the index space and the addresses in the buffer, indicating by the mapping the respective ranges of the data to which the work units are to be applied, and responsively to the mapping, to schedule execution of the work units by the one or more consumer processors such that at least one of the work units can begin execution before all the producer processors have completed the first processing stage and outputted the data to the respective locations in the buffer.

18. The product according to claim 17, wherein the mapping comprises a linear transformation between values in the index space and the addresses in the buffer.

19. The product according to claim 17, wherein the mapping comprises a multi-dimensional transformation between the addresses in the buffer and the index space.

20. The product according to claim 17, wherein the multi-dimensional transformation applies different, respective coefficients to transform different dimensions of the buffer.

\* \* \* \* \*